US005968667A

United States Patent [19]

[11] Patent Number: 5,968,667
[45] Date of Patent: Oct. 19, 1999

Assante et al.

[54] TRANSPARENCIES FOR ELECTROSTATIC REPROGRAPHY

[75] Inventors: Jean-Pierre Assante, Villeurbanne; Philippe Corsi, Trevoux; Nicole Pecate, Montesson; Michel Prissette, Bron; Joël Richard, Chantilly; Didier Veyrat, St-cyr-au-mont-d'or, all of France

[73] Assignee: Rhone-Poulenc Films, Miribel, France

[21] Appl. No.: 09/008,502

[22] Filed: Jan. 16, 1998

Related U.S. Application Data

[63] Continuation of application No. 08/535,529, Sep. 28, 1995, abandoned.

[30] Foreign Application Priority Data

Sep. 28, 1994 [FR] France .................................. 94 11808

[51] Int. Cl.$^6$ .................................................... B32B 27/06
[52] U.S. Cl. ............................................ 428/480; 428/483
[58] Field of Search ...................................... 428/480, 483

[56] References Cited

U.S. PATENT DOCUMENTS 4,370,379 1/1983 Kato et al. .............................. 428/480

FOREIGN PATENT DOCUMENTS 240147 10/1987 European Pat. Off. .
332183 9/1989 European Pat. Off. .
442567 8/1991 European Pat. Off. .
588724 3/1994 European Pat. Off. .
613056 8/1994 European Pat. Off. .
91/17486 11/1991 WIPO .

OTHER PUBLICATIONS

Database WPI, Week 9215, Derwent Publications Ltd., London, GB; AN92–118626 & JP–A–04060644, (Diafoil KK), 26 Feb. 1992.

*Primary Examiner*—Mark Chapman
*Attorney, Agent, or Firm*—Burns, Doane, Swecker & Mathis, L.L.P.

[57] ABSTRACT

Transparent receptor substrates, well suited for electrostatic reprography, e.g., for the production of overhead transparencies, exhibit excellent transparency, good slip, good adhesion of toner thereto and good electrical conductivity, comprise (i) a transparent composite polyester base(s) having (ii) a toner-receptive primer coating (P) on at least one of the face surfaces thereof, such composite polyester base comprising (a) a thick layer (A) of semicrystalline polyester and (b) a thin layer (B) of an identical or different polyester adhered to at least one of the face surfaces of said thick layer (A), and the at least one primer coating (P) comprising an acrylic polymer having a glass transition temperature ranging from 10° C. to 50° C., a free —COOH carboxylic functional group content less than 50 millimoles per 100 grams of said acrylic polymer and a thickness no greater than 0.3 $\mu$m.

26 Claims, No Drawings

TRANSPARENCIES FOR ELECTROSTATIC REPROGRAPHY

This application is a continuation of application Ser. No. 08/55,529, filed on Sep. 28, 1995, now abandoned.

BACKGROUND OF THE INVENTION

1. Technical Field of the Invention

The present invention relates to transparent receptor components or substrates comprising a polyester base for electrostatic photocopying, notably for the production of overhead transparencies.

2. Description of the Prior Art

It is known to this art that photocopies that can be projected onto a screen by means of an overhead projector are easily obtained from a source document by electrostatic photocopying same onto a transparent base. According to this process a uniform, positive or negative electrostatic charge is applied to a photoconductive surface preserving this charge when it is maintained sheltered from light, and the image of a subject to be copied (text, drawing and the like) is formed on said surface by means of an optical system and of a source of light. In the regions where light impinges on the charged surface, the electrical charge is dissipated by grounding, the other regions then forming or defining the electrostatic image of the source document; particles of an electrostatic ink in powder form (hereinafter simply "toner") of opposite charge to that of the electrostatic surface are then deposited onto the latter via electrostatic attraction. The image thus obtained is then intimately contacted with a base, for example a transparent base substrate, to which an opposite electrostatic charge is applied, in order to transfer the toner from the electrostatic surface onto the base. The image thus obtained is fixed onto the base by heat treatment and/or by pressure.

The transparent bases employed for producing projectable electrostatic photocopies must satisfy various requirements to obtain projected images of excellent quality, in particular, sharp images. They must exhibit, particularly, a transparency, a dimensional stability and a high slip, a low capacity for accumulating static electricity charges and good adhesion to the image printing material. It too is known that these bases must exhibit, more particularly, a transparency such that the percentage of light scattered by the passage of the light rays through the thickness thereof, or haze, is less than or equal to 7%. It is also known that when these bases are prepared from a biaxially oriented film, especially a polyester, they must exhibit a dimensional stability such that their shrinkage at 150°–170° C., namely, under the temperature conditions required for fixing the toner, is less than 1% in the directions of drawing.

By reason of their excellent mechanical, physical and chemical properties, polyester films constitute a material of choice for producing transparent bases for projectable electrostatic photocopies. However, their low slip, their great tendency to accumulate static electricity by rubbing or induction and their relative chemical inertness, which is reflected in a low adhesiveness of the toner to the base, present problems which have required solutions complicating the manufacture of transparent bases and making it more costly.

Thus, the drawback of the slip of polyester films cannot be resolved by creating a surface roughness using particles of a filler dispersed within the polyester. Indeed, because of the thickness of the films destined for use as a base far electrostatic photocopying, which ranges from 50 to 200 $\mu$m, the presence of filler throughout their thickness imparts a substantial haze which is incompatible with such intended use. The transparency can be obtained only at the expense of a decrease in the filler content, which compromises the slip of the bases and consequently the ability of the bases to slide over one another in the reams employed in photocopying machines, or to slide over the metal surfaces of said machines.

The low affinity of the polyester films for the toner is reflected in easy removal of the toner when the photocopies are being handled and by a gradual deterioration of the image. In its turn, the ability of the polyester base to accumulate static electricity interferes both with the uniform deposition of the toner onto the base during photocopying, which is detrimental to image quality, and with the sheet-by-sheet feed of the bases from a ream source.

To avoid the problems presented by the adhesion of the toner to the base, the transparency, the slip and the tendency to accumulate electrical charges, it has been proposed to deposit, by spreading onto at least one face surface of a filler-free transparent polyester film, a coating comprising a polymeric binder which has at least a good adhesion to the toner and which contains fillers creating a sufficient roughness on the base to impart the necessary slip thereto, and, if appropriate, an antistatic agent. In an alternative embodiment of this solution, a filled adhesive or primer coating is deposited onto one face surface of the polyester film and an antistatic coating on the other face surface.

Thus, U.S. Pat. No. 4,526,847 describes depositing onto a filler-free polyester film a coating of a composition comprising a solution or nitrocellulose in an organic solvent (esters, ketone) containing a plasticizer, a filler which has a particle size of 0.3 to 10 $\mu$m (for example colloidal silica) and an antistatic agent.

European Patent Application EP-A-332,183 describes transparent components for electrostatic photocopying, namely, a filler-free polyester base coated with a layer of an acrylic binder containing a filler and an antistatic agent. However, it remains necessary to interpose between the acrylic coating and the polyester a primer facilitating adhesion of the is layer destined to receive the toner to the polyester.

And European Patent Application EP-A-104,074 describes depositing onto one face surface of a polyester base film an acrylic coating containing a filler and providing the adhesion to the toner and, on the other face surface of the polyester base, a coating containing an electrically conductive polymer; placing of a primer coating between the polyester base and the layer receiving the toner is also recommended.

The solutions proposed by the aforesaid prior art are only partially satisfactory. Indeed, the use of compositions based on organic solvents presents health and safety concerns. Certain of the solutions adopted entail increasing the number or layers of coatings: (a) application of a primer which exhibits good adhesiveness of the polyester base to the latter receiving the toner; (b) deposition of a receiving layer providing the adhesiveness of the toner, good slip and, where appropriate, good electrical conductivity; and (c) optionally deposition or an antistatic coating onto the face surface of the base film which is opposite to that receiving the toner. It has also been found that the introduction or an antistatic agent into the adhesiveness layer destined to receive the toner may, depending on the nature of said agent, decrease the effectiveness of the adhesion of the toner to the receptor layer. The presence of fillers in the layer receiving the toner also presents the disadvantage of requiring a thickness of said layer which is greater than that required merely from the standpoint of enhancing the adhesion of the toner to the base.

SUMMARY OF THE INVENTION

Accordingly, a manor object of the present invention is the provision of improved transparencies for electrostatic photocopying or reprography, said transparencies exhibiting an excellent transparency, good slip, good adhesion of the toner to the base and good electrical conductivity, and which otherwise avoid or conspicuously ameliorate the above disadvantages and drawbacks to date characterizing the state of this art.

Briefly, the present invention features novel transparent receptor components or substrates for electrostatic photocopying which comprise a transparent polyester base (S) having on at least one of its face surfaces a primer coating (P) for adhesion of the toner to the polyester base, said polyester base (S) comprising a composite or:

(a) a thick layer (A) of semicrystalline polyester, (b) on at least one of the race surfaces of the thick layer (A), a thin layer (B) of polyester which may be identical to or different from that constituting the layer (A), and further wherein the primer coating (P) comprises an acrylic polymer which has a glass Transition temperature of 10° C. to 50° C., a free —COOH carboxylic functional group content less than 50 millimoles per 100 grams of said acrylic polymer, and said primer crazing (P) having a thickness equal to or less than 0.3 gm.

DETAILED DESCRIPTION OF BEST MODE AND PREFERRED EMBODIMENTS OF THE INVENTION

More particularly according to the present invention, by the expression "transparent components (or transparencies) for electrostatic photocopying" are intended receptor components or substrates which can be used directly for producing photocopies that can be projected onto a screen, whether in the form of a continuous film or of sheets of appropriate format which can be obtained by cutting the films.

The "free carboxylic functional groups" are the total free carboxylic functional groups of the acrylic polymer.

The polyesters constituting the layers (A) and (B) of the base film (S) may be identical or different, although it is simpler to employ the same polyester for both types of layers. In this respect, in the case of the layer (A), polyesters can be used that are typically employed for producing biaxially oriented semicrystalline films. These are film-forming linear polyesters which can be crystallized by orientation or stretching and which are usually prepared from one or more aromatic dicarboxylic acids or derivatives thereof (for example esters of lower aliphatic alcohols, or halides) and from one or more aliphatic glycols. Exemplary such aromatic diacids include phthalic, terephthalic, isophthalic, 2,5-naphthalenedicarboxylic and 2,6-naphthalenedicarboxylic acids. These acids may be used in combination with a minor amount of one or more aliphatic dicarboxylic acids such as adipic, azelaic and hexahydroterephthalic acids. Exemplary aliphatic diols include ethylene glycol, 1,3-propanediol and 1,4-butanediol. These dials may be used in combination with a minor amount of one or more aliphatic dials which are more condensed in respect of carbon (for example neopentyl glycol) or cycloaliphatic dials (cyclohexanedimethanol). The crystallizable film-forming polyesters are preferably polyterephthalates or polynaphthalenedicarboxylates of alkylene dials and, in particular, the polyterephthalate of ethylene glycol (PET) or of 1,4-butanediol, or copolyesters containing at least 80 mol % of alkylene glycol terephthalate or naphthalenedicarboxylate recurring structural units. The polyester is advantageously a polyethylene terephthalate whose viscosity index, measured in a 50/50 mixture by weight of phenol and of 1,2-dichlorobenzene according to ISO standard 1628-5, ranges from 55 ml/g to 75 ml/g.

The thin layer (B) may comprise the same crystallizable polyester as the layer (A), or of a polyester which is not crystallizable or less crystallizable than the polyester constituting the layer (A) Polyesters are then employed containing larger or smaller amounts of structural units providing amorphousness, such as those derived from isophthalic acid, from neopentyl glycol or from cyclohexanedimethanol. It is also within the scope of the present invention to employ a mixture of a crystallizable polyester and of a polyester containing structural units imparting amorphousness to produce the thin filled layer (B). It is thus possible to employ mixtures containing from 20% to 80% by weight of a crystallizable polyester and from 80% to 20% by weight of a polyester containing structural units imparting amorphousness. The layer (B) can also comprise a copolyester including a plurality of sulfonic acid groups or the alkali or alkaline earth metal or ammonium salts thereof (hereinafter the sulfonated copolyester), or mixtures of copolyesters of this type with one or more polyesters not containing any sulfonic group, such as the semicrystallizable polyesters or the polyesters containing structural units imparting amorphousness.

The acrylic polymer comprises recurring structural units selected from among those derived from acrylic acid, methacrylic acid, alkyl acrylates, alkyl methacrylates, acrylonitrile, methacrylonitrile, acrylamide, methacrylamide, N-methylolacrylamide, N-methoxymethacrylamide, styrene, butadiene or vinyl esters, at least a fraction of these structural units originating from an alkyl acrylate and/or an alkyl methacrylate.

The acrylic polymer according to the invention preferably contains at least some structural units derived from alkyl acrylates selected from among methyl acrylate, ethyl acrylate, propyl acrylates and butyl acrylates and/or structural units derived from alkyl methacrylates selected from among methyl methacrylate, ethyl methacrylate, propyl methacrylates and butyl methacrylates. The acrylic copolymers comprising recurring structural units derived from methyl and/or ethyl acrylate and from methyl and/or ethyl methacrylate are particularly suitable for forming the primer coating (P) of the transparent components of the invention. The acrylic polymer may also contain acrylic acid and/or methacrylic acid structural units, insofar as the content of free carboxylic acid functional groups is less than 50 millimoles per 100 grams of said acrylic polymer and preferably remains lower than or equal to 30 millimoles per 100 g.

The acrylic polymer comprising the composition of the primer coating (P) of the components of the invention advantageously has a glass transition temperature ranging from 15° C. to 30° C.

The antistatic nature of the transparencies for electrostatic photocopying is an important parameter.

To improve this antistatic nature, the acrylic polymer comprising the primer (P) of the components for photocopying may contain up to 25% by weight of a compound (monomer of polymer) containing quaternary ammonium groups.

This compound containing quaternary ammonium groups may be present as a mixture with the acrylic polymer described above or may comprise a part of the structural units of said acrylic polymer. In other words, a mixture of the acrylic polymer with a compound containing quaternary ammonium groups can be used, or a copolymer containing the structural units described above in the case of the acrylic polymer and structural units containing quaternary ammonium groups.

The compound containing quaternary ammonium groups preferably constitutes from 2% to 15% by weight relative to the weight of the combination of acrylic polymer and compound containing quaternary ammonium groups.

The compounds containing quaternary ammonium groups, which are directly used or which are the source of polymers containing quaternary ammonium groups which are themselves used, advantageously correspond to the following general formula (I):

(I)

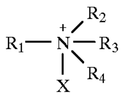

in which $R_1$ is an acyloxyalkyl or acylaminoalky radical containing a saturated acyl group or containing a carbon—carbon ethylenic double bond, an alkoxyalkyl radical, an aryloxyalkyl radical, an alkylaryloxyalkyl radical, an alkenyloxyalkyl radical or an alkenylaryloxyalkyl radical; $R_2$, $R_3$ and $R_4$, which may be identical or different, are each an alkyl radical having from 1 to 6 carbon atoms or a polyoxyethylene radical $$-(CH_2-CH_2-O)_{\overline{n}}-H$$

or $$-(CH_2-CH_2-O)_{\overline{n}}-CH_3$$

wherein n is a number ranging from 1 to 12; and X is an anion selected from among the halides, in particular the chloride, sulfate, sulfonate, alkyl sulfonates such as methyl sulfonate, arylsulfonates, arylalkyl sulfonates, carbonate, alkyl carbonates such as methyl carbonate, nitrate, phosphate, alkyl phosphates, or mixtures of such anions.

Depending on whether or not the radical $R_1$ includes an ethylenic double bond, the compound containing quaternary ammonium groups of formula (I) will be copolymerizable with the acrylic polymer or will be employed in admixture with the acrylic polymer.

Stearamidopropyldimethyl-β-hydroxyethyl-ammonium nitrate is exemplary of the nonpolymerizable compounds of formula (I).

Among the polymerizable compounds of formula (I), more particularly exemplary are the monomers of general formulae (II) or (III):

(II)

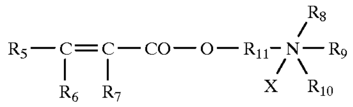

(III)

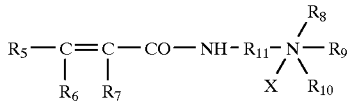

in which $R_5$, $R_6$ and $R_7$, which may be identical or different, are each a hydrogen atom, a methyl radical or an ethyl radical; $R_8$, $R_9$ and $R_{10}$, which may be identical or different, are each an alkyl radical having from 1 to 4 carbon atoms, or a polyoxyethylene radical $$-(CH_2-CH_2-O)_{\overline{m}}-H$$

or $$-(CH_2-CH_2-O)_{\overline{m}}-CH_3,$$

wherein m is a number ranging from 1 to 8; $R_{11}$ is a divalent radical such as polyethylene or hydroxyalkylene having from 1 to 8 carbon atoms; and X is an anion selected from among the halides, in particular the chloride, sulfate, sulfonate, alkyl sulfonates such as methyl sulfonate, arylsulfonates, arylalkylsulfonates, carbonate, alkyl carbonates such as methyl carbonate, nitrate, phosphate, alkyl phosphates, or mixtures of such anions.

When a compound containing quaternary ammonium groups is employed, the acrylic polymer does not contain any free carboxylic acid functional groups.

The antistatic nature is evaluated from the measurement of a half-discharge time. The surface of the film is charged with a corona treatment to a potential 500V. The corona charging device is turned off and the decrease in the surface potential is observed. The measurement marks the time for attaining a surface potential of 250 V. The shorter the time, the more antistatic is the film It is generally considered that a satisfactory level of antistatic nature is attained when this half-discharge time is shorter than or equal to 20 seconds and preferably shorter than or equal to 10 seconds.

The thickness of the primer coating (P) is preferably equal to or smaller than 0.2 μm.

It is generally preferable that there should be no filler particles in the thick layer (A) and that the fillers should be present in the thin layers (B), in order that the base films should have a transparency that is as high as possible, namely, a haze (or cloudiness) lower than or equal to 7%.

The nature of the fillers present in the layer (B) is not critical and it is possible to use the fillers typically employed for imparting to polyester films a surface roughness which is sufficient to impart good machinability thereto. Preferably, inorganic fillers are used, such as oxides and salts of the elements of Groups II, III and IV of the Periodic Table. Metal salts such as calcium carbonate or barium sulfate, and oxides such as silica, alumina, zirconia, and mixtures of oxides, silicates or aluminosilicates are exemplary thereof.

These fillers may have been subjected to a treatment intended to limit or to prevent the agglomeration of the particles of which they are composed and/or to limit or to prevent the loss or cohesion at the polyester/particle interface.

The particle concentration is selected such as to provide the base film both with a haze which is lower than or equal to 7% and a sufficient surface roughness (Rz lower than or equal to 0.6 μm). In general, the concentration and the particle size of the fillers are selected as a function of the thickness of the layer (B) and of the melting point of the polymer(s) comprising same and can be readily determined by one skilled in this art, in order to impart the desired transparency and roughness to the transparencies. Compare very particularly EP-A-0,260,258, which describes films that are very well suited as transparent polyester bases for the transparent components for electrostatic photocopying of the invention.

It is particularly advantageous to use fillers which have a relatively narrow particle diameter distribution, i.e., monodisperse fillers.

The shape or morphology of the particles of the fillers introduced into the layer(s) (B) is not critical and fillers of various shares, spherical or otherwise, can be used.

When a layer (B) is deposited onto the face surfaces of the layer (A), the two layers may differ from each other in their thickness and the nature, the concentration or the particle diameter of the filler. For obvious reasons of simplicity, the two layers (B) are preferably identical.

Although the composite polyester base film can be produced by any known processes for obtaining composite films, preferably composite films obtained by coextrusion are employed, which exhibit an excellent cohesion at the interface of the layer (A) and of the layer(s) (B)

To the is end, a melt (A) of crystallizable polyester is extruded with the aid of a first extruder and, simultaneously, a melt of the polyester (B) that forms the layer(s) is extruded with the aid of a second extruder. The two extruders are connected to a coextrusion adapter in which the melt (B) may, if appropriate, be divided into two flowstreams (B). The polyester melt streams are converted into an amorphous multilayer film by extrusion through a flat die and the amorphous film thus obtained is subjected to the usual film manufacturing operations: quenching, drawing, heat-setting and winding.

The film production conditions are those typically employed industrially to produce oriented semicrystalline polyester films. On exiting the die, the amphorous composite film is cooled to a temperature of from 10° C. to 45° C. on a casting drum.

The conditions for drawing or stretching the extruded composite film are those typically employed in the manufacture of semicrystalline polyester films. It is thus possible to carry out a monoaxial drawing or a biaxial drawing performed successively or simultaneously in two directions which are generally at right angles, or else using sequences of at least three drawing operations where the drawing direction is changed in each sequence. Furthermore, each unidirectional drawing itself can be conducted in a number of steps. It is thus possible to combine drawing sequences, such as, for example, two successive biaxial drawing treatments, it being possible for each drawing to be performed in a number of stages.

The composite film is preferably subjected to a biaxial drawing in two perpendicular directions. It is possible, for example, to first conduct a drawing operation in the direction of travel of the file (lengthwise drawing) or in a perpendicular direction (transverse drawing), or vice-versa. In general, the lengthwise drawing is carried out to a stretch ratio or 3 to 5 (i.e., the length of the drawn film is from 3 to 5 times the length of the amphorous film) and at a temperature of 80° C. to 135° C. and the transverse drawing is carried out at a stretch ratio of 3 to 5 at a temperature of 90° C. to 135° C. and preferably of from 100° C. to 125° C.

After drawing, the composite film is subjected to a heat treatment at a temperature ranging from 160° C. to 240° C.

The drawing may also be carried out simultaneously, namely, in the lengthwise direction and in the transverse direction at the same time, For example, with a draw ratio of 3 to 5 and at a temperature of 80° C. to 120° C.

The throughput of the extruders depends on the desired thickness of the layers (A) and (B) after drawing.

The thickness tA of the layer (A) may vary over wide limits; it generally ranges from approximately 50 μm to approximately 150 μm. Although the thickness tB of the layer (B) is not critical, it must be selected such that the base film retains an excellent transparency and, in particular, a haze less than or equal to 5% and preferably less than or equal to 4%. The thickness which permits this objective to be attained depends to some extent on the concentration and on the particle size of the filler present in the layer (B); in general, it is preferable that the thickness of the layer (B) should be equal to or smaller than 3 μm.

The tB preferably ranges from 0.5 μm to 1.5 μm.

Because of the temperatures to which the transparent components are subjected during electrostatic photocopying operations, the polyester base must have an excellent dimensional stability at 150° C. More specifically, the base must have a shrinkage ratio at 150° C. in both drawing directions which is lower than or equal to 1% and preferably lower than or equal to 0.7%. This objective is attained by subjecting the biaxially drawn and heat-set film to a relaxation treatment in the transverse direction and in the lengthwise direction, in accordance with the usual techniques which are well known to this art. The shrinkage ratios in the lengthwise direction and in the transverse direction are preferably selected such as not to differ too greatly in value, in order to prevent the formation of microripples in the transparent components after they have been transferred through the photocopying machines. It is preferable that the difference in the shrinkage values in the two directions should be smaller than or equal to 0.3%.

In the transparencies for electrostatic photocopying according to the invention, the composite polyester base (S) preferably has a haze lower than or equal to 7%, a shrinkage ratio in the lengthwise and transverse drawing directions at 150° C. which is lower than or equal to 1% and a total roughness Rz which is lower than or equal to 0.6 μm.

The deposition of the coating (P) onto the composite polyester film may be carried out according to any one of a variety of techniques well known to this art. Thus, an aqueous dispersion or solution of the selected acrylic polymer may be deposited by gravity from a slot caster, or by passing the film through the emulsion or the solution, or else by means of transfer rolls. The thickness of the layer is controlled by any suitable means. The deposition of the coating may be carried out either before any drawing or stretching of the film (in-line coating) or after drawing, before or after heat-setting (out-of-line coating) . It is preferred, however, to conduct the coating of the polyester film before the drawing pr between two drawing operations.

An acrylic polymer latex is preferably employed, prepared by emulsion or microemulsion polymerization, or, if appropriate, by polymerization in an organic medium. These techniques are also well known to this art and will not be repeated here.

The acrylic polymers employed according to the present invention are therefore preferably applied in the form of stable dispersions, or latices, in water or in a hydroorganic medium. When the polymer does not contain any hydrophilic group or moiety permitting a latex to be easily obtained, it may be used in combination with one or a plurality of ionic or nonionic is surfactants, such as those typically employed to obtain aqueous dispersions and well known to this art. To obtain particles, the polymer content of the latices is not critical and may vary over wide limits. In general, latices containing from 1% to 50% by weight of polymer are well suited; preferably, latices containing from 5% to 30% by weight of polymer are used. The particle size of the polymer forming the latex is selected such that the final thickness of the coating (P) should not obliterate the roughness of the underlying filled layer (B); latices in which the polymer particle diameter ranges from approximately 0.01 μm to 0.3 μm and preferably from 0.05 μm to 0.15 μm are generally used.

The amount of aqueous coating composition deposited onto the film depends, on the one hand, on its solids content and, on the other, on the desired thickness of the coating of the finished or final film, namely, after drawing and heat-setting when the coating is carried out in-line. This amount also depends on the timing of the coating, the change in the thickness of the coating before and after drawing must obviously be taken into account when the coating is carried out before drawing.

After coating, the polyester film is hear-treated to remove the water present in the coating and, if appropriate, to effect crosslinking of the polymer. In the event of in-line coating, it is generally unnecessary to utilize a heat treatment; the drying and possibly the crosslinking are carried out during the drawing and the heat-setting. However, it is within the scope of the present invention to perform, in this instance, a sufficient heat treatment, prior to the drawing and to the heat-setting, to effect the drying of the coated layer.

The thickness tP of the coating layer (P) is such that it does not obliterate the roughness of the underlying filled layer (B). Utilizing in-line coating and the selection of the acrylic polymer permit this objective to be met without, however, impairing the adhesion of the toner. In general, the tP ranges from 0.02 μm to 0.2 μm and preferably from 0.02 μm to 0.15 μm.

The use of a base (S) comprising a thick unfilled layer (A) and at least one thin layer (B) preferably containing a filler permits easy production, after deposition of the adhesion layer (P), of transparent components for electrostatic photocopying which exhibit the required combination of the properties of transparency, machinability and adhesion of the toner thereto. Lastly, there is no need to increase the number of depositions of adhesion layers onto the base (S) , for example an adhesion primer and then a layer for receiving the toner, or to incorporate into the latter fillers which may be subject to abrasion when the transparencies are being employed. Furthermore, use of a coextruded composite base (S) make it_ possible, without difficulty, to attain a good compromise between transparency and machinability.

In order to further illustrate the present invention and the advantages thereof, the following specific examples are given, it being understood that same are intended only as illustrative and in nowise limitative.

EXAMPLE 1

The following materials were introduced into a 1.5 liter reactor fitted with an anchor stirrer:

| | | |
|---|---|---|
| (i) water | 853 | g |
| (ii) sodium lauryl sulfate | 1.5 | g |

The resulting solution was heated to 80° C.

1.05 g of ammonium persulfate dissolved in 18.95 g of water was added thereto.

The following reagents were then continuously introduced therein:

(a) over 7 h, the following mixture of:

| | | |
|---|---|---|
| (i) ethyl acrylate | 175.5 | g |
| (ii) methyl methacrylate | 117.9 | g |
| (iii) methacrylaic acid | 4.5 | g |
| (iv) ethylene glycol dimethacrylate | 2.1 | g |

(b) over 8 h, the following mixture of:

| | | |
|---|---|---|
| (i) ammonium persulfate | 0.84 | g |
| (ii) sodium bicarbonate | 1.23 | g |
| (iii) sodium lauryl sulfate | 1.5 | g |
| (iv) water | 46.4 | g |

The reaction mixture was maintained at 80° C. for 1 h and was then cooled.

A latex A having a solids content of 25% was obtained.

The acrylic polymer had a glass transition temperature of 20° C. and a free carboxylic functional group content of 17 millimoles per 100 g of polymer.

EXAMPLE 2

The following materials were introduced into a 1.5 liter reactor fitted with an anchor stirrer:

| | | |
|---|---|---|
| (i) water | 730 | g |
| (ii) emulsifier containing an amine functional group quaternized by hydroxethyl groups (Ethoquad C12 ®) | 1.5 | g |
| (iii) ethyl acrylate | 13.8 | g |
| (iv) methyl methacrylate | 10.2 | g |

The resulting solution was heated to 75° C.

0.30 g of water soluble initiator of the diazo compound type containing a quaternary ammonium group (V50), dissolved in 9.7 g of water, was added.

The following reagents were then continuously introduced therein:

(a) over 7 h, the following mixture of:

| | | |
|---|---|---|
| (i) ethyl acrylate | 124.2 | g |
| (ii) methyl methacrylate | 91.8 | g |

and

| | | |
|---|---|---|
| (i) acryloyloxyethyltrimethylammonium chloride | 75 | g |
| (ii) water | 45 | g |

(b) over 8 h, the following solution of:

| | | |
|---|---|---|
| (i) V50 initiator | 3.6 | g |
| (ii) Ethoquad C12 ® emulsifier | 1.5 | g |
| (iii) water | 50 | g |

The reaction mixture was maintained at 75° C. for 1 h and was then cooled.

A latex B having a solids content of 26% was obtained.

The acrylic polymer had a glass transition temperature of 21° C. and a free carboxylic functional group content of 0 millimoles per 100 g of polymer.

EXAMPLE 3

The following materials were introduced into a 1.5 liter reactor fitted with an anchor stirrer:

| | | |
|---|---|---|
| (i) water | 760 | g |
| (ii) Ethoquad C12 ® emulsifier | 1.5 | g |

The resulting solution was heated to 60° C.

0.30 g of V50 initiator dissolved in 9.7 g of water was added.

The following were then continuously introduced therein:

(a) over 7 h, the following mixture of:

| | | |
|---|---|---|
| (i) ethyl acrylate | 172.8 | g |
| (ii) methyl methacrylate | 127.2 | g |

(b) over 8 h, the following solution of:

| | | |
|---|---|---|
| (i) V50 initiator | 3.6 | g |
| (ii) Ethoquad C12 ® emulsifier | 1.5 | g |
| (iii) water | 50 | g |

The reaction mixture was maintained at 60° C. for 1 h and was then cooled.

A latex C having a solids content of 27% was obtained.

The acrylic polymer had a glass transition temperature of 20° C. and a free carboxylic functional group content of 0 millimoles per 100 g of polymer.

Two mixtures were prepared from this latex, containing 1.6% (C1) and 3.6% (C2) by weight, respectively, of stearamidopropyldimethtyl-β-hydroxyethylammonium nitrate relative to the total weight of the latex (in order to provide, after dilution to a total solids content of 17%, 1% and 2% of the quaternary ammonium compound, respectively)

EXAMPLE 4

The following materials were introduced into a 1.5 liter reactor fitted with an anchor stirrer:

| | | |
|---|---|---|
| (i) water | 730 | g |
| (ii) Ethoquad C12 ® emulsifier | 1.5 | g |
| (iii) ethyl acrylate | 16.5 | g |
| (iv) methyl methacrylate | 12 | g |

The resulting solution was heated to 75° C.

0.30 g of V50 water-soluble initiator dissolved in 9.7 g of water was added thereto.

The following were then continuously introduced therein:

(a) over 7 h, the following mixture of:

| | | |
|---|---|---|
| (i) ethyl acrylate | 148.5 | g |
| (ii) methyl methacrylate | 108 | g |

and

| | | |
|---|---|---|
| (i) acryloyloxyethyltrimethylammonium chloride | 19 | g |
| (ii) water | 30 | g |

(b) over 8 h, the following solution of:

| | | |
|---|---|---|
| (i) V50 initiator | 3 | g |
| (ii) Ethoquad C12 ® emulsifier | 1.5 | g |
| (iii) water | 50 | g |

The reaction mixture was maintained at 75° C. for 1 h and then cooled.

A latex D having a scolds content of 27% was obtained.

The acrylic polymer had a glass transition temperature of 23° C. and a free carboxylic functional group content of 0 millimoles per 100 g of polymer

EXAMPLE 5

The following materials were introduced into a 1.5 liter reactor fitted with an anchor stirrer:

| | | |
|---|---|---|
| (i) water | 665 | g |
| (ii) Ethoquad C12 ® emulsifier | 1.5 | g |
| (iii) ethyl acrylate | 10.5 | g |
| (iv) methyl methacrylate | 7.5 | g |

The resulting solution was heated to 75° C.

0.30 g of V50 water-soluble initiator dissolved in 9.7 g of water was added thereto.

The following were then continuously introduced therein:

(a) over 7 h, the following mixture of:

| | | |
|---|---|---|
| (i) ethyl acrylate | 94.5 | g |
| (ii) methyl methacrylate | 67.5 | g |

and

| | | |
|---|---|---|
| (i) acryloyloxyethyltrimethylammonium chloride | 150 | g |
| (ii) water | 60 | g |

(b) over 8 h, the following solution of:

| | | |
|---|---|---|
| (i) V50 initiator | 3.6 | g |
| (ii) Ethoquad C12 ® emulsifier | 1.5 | g |
| (iii) water | 50 | g |

The reaction mixture was maintained at 75° C. for 1 h and then cooled.

A latex E having a solids content of 27% was obtained.

The acrylic polymer had a glass transition temperature of 17° C. and a free carboxylic functional group content of 0 millimoles per 100 g of polymer.

COMPARATIVE EXAMPLE 1

The following materials were introduced into a 1.5 liter reactor fitted with an anchor stirrer:

| | | |
|---|---|---|
| (i) water | 848.5 | g |
| (ii) sodium lauryl sulfate | 1.5 | g |

The resulting solution was heated to 80° C.

1.05 g of ammonium persulfate dissolved in 18.95 g of water was added thereto.

The following reagents were then continuously introduced therein:

(a) over 7 h, the following mixture of:

| | | |
|---|---|---|
| (i) ethyl acrylate | 162 | g |
| (ii) methyl methacrylate | 99 | g |
| (iii) methacrylic acid | 39 | g |

(b) over 8 h, the following solution of:

| | | |
|---|---|---|
| (i) ammonium persulfate | 0.84 | g |
| (ii) sodium bicarbonate | 1.23 | g |
| (iii) sodium lauryl sulfate | 1.5 | g |
| (iv) water | 46.4 | g |

The reaction mixture was maintained at 800C for 1 h and then cooled.

A latex I having a solids content of 25% was obtained.

The acrylic polymer had a glass transition temperature of 33° C. and a free carboxylic functional group content of 150 millimoles per 100 g of polymer.

COMPARATIVE EXAMPLE 2

The following materials were introduced into a 1.5 liter reactor fitted with an anchor stirrer:

| | | |
|---|---|---|
| (i) water | 751 | g |
| (ii) sodium lauryl sulfate | 1.5 | g |
| (iii) water-dispersible polyester | 93 | g |

The water-dispersible polyester employed was a copolyester comprising recurring structural units derived from terephthalic acid, isophthalic acid, Na isophthalic acid 5-sulfate and from ethylene glycol, marketed under the trademark Gérol PS20.

The resulting solution was heated to 80° C.

0.72 g of ammonium persulfate dissolved in 19.28 g of water was added thereto.

The following reagents were then continuously introduced therein:

(a) over 7 h, the following mixture of:

| | | |
|---|---|---|
| (i) ethyl acrylate | 58.5 | g |
| (ii) methyl methacrylate | 120 | g |
| (iii) methacrylic acid | 26.4 | g |
| (iv) ethylene glycol dimethacrylate | 2.1 | g |

(b) over 8 h, the following solution of:

| | | |
|---|---|---|
| (i) ammonium persulfate | 0.58 | g |
| (ii) sodium bicarbonate | 0.85 | g |
| (iii) sodium lauryl sulfate | 1.05 | g |
| (iv) water | 47.52 | g |

The reaction mixture was maintained at 800C for 1 h and then cooled.

A latex J having a solids content of 27% was obtained.

The acrylic polymer had a glass transition temperature of 30° C. and a free carboxylic functional group content of 102 millimoles per 100 g of polymer.

COMPARATIVE EXAMPLE 3

The following materials were introduced into a 1.5 liter reactor fitted with an anchor stirrer:

| | | |
|---|---|---|
| (i) water | 848.5 | g |
| (ii) sodium lauryl sulfate | 1.5 | g |

The resulting solution was heated to 80° C.

1.05 g of ammonium persulfate dissolved in 18.95 g of water was added thereto.

The following reagents were then continuously introduced therein:

(a) over 7 h, the following mixture of:

| | | |
|---|---|---|
| (i) ethylacrylate | 105.6 | g |
| (ii) methyl methacrylate | 181.5 | g |
| (iii) methacrylic acid | 12.9 | g |

(b) over 8 h, the following solution of:

| | | |
|---|---|---|
| (i) ammonium persulfate | 0.84 | g |
| (ii) sodium bicarbonate | 1.23 | g |
| (iii) sodium lauryl sulfate | 1.5 | g |
| (iv) water | 46.4 | g |

The reaction mixture was maintained at 800C for 1 h and then cooled.

A latex K having a solids content of 25% was obtained.

The acrylic polymer had a glass transition temperature of 56° C. and a free carboxylic functional group content of 50 millimoles per 100 g of polymer.

COMPARATIVE EXAMPLE 4

The following materials were introduced into a 1.5 liter reactor fitted with an anchor stirrer:

| | | |
|---|---|---|
| (i) water | 848.5 | g |
| (ii) sodium lauryl sulfate | 1.5 | g |

The resulting solution was heated to 80° C.

1.05 g of ammonium persulfate dissolved in 18.95 g of water was added thereto.

The following reagents were then continuously introduced therein:

(a) over 7 h, the following mixture of:

| | | |
|---|---|---|
| (i) ethyl acrylate | 111 | g |
| (ii) methyl methacrylate | 163 | g |
| (iii) methacrylic acid | 26 | g |

(b) over 8 h, the following solution of:

| | | |
|---|---|---|
| (i) ammonium persulfate | 0.84 | g |
| (ii) sodium bicarbonate | 1.23 | g |
| (iii) sodium lauryl sulfate | 1.5 | g |
| (iv) water | 46.4 | g |

The reaction mixture was maintained at 80° C. for 1 h and then cooled.

A latex L having a solids content of 25% was obtained.

The acrylic polymer had a glass transition temperature of 58° C. and a free carboxylic functional group content of 100 millimoles per 100 g of polymer.

COMPARATIVE EXAMPLE 5

The following materials were introduced into a 1.5 liter reactor fitted with an anchor stirrer:

| | | |
|---|---|---|
| (i) water | 848.5 | g |
| (ii) sodium lauryl sulfate | 1.5 | g |

The resulting solution was heated to 800C.

1.05 g of ammonium persulfate dissolved in 18.95 g of water was added thereto.

The following reagents were then continuously introduced therein:

(a) over 7 h, the following mixture of:

| | | |
|---|---|---|
| (i) ethyl acrylate | 85.5 | g |
| (ii) methyl methacrylate | 175.8 | g |
| (iii) methacrylic acid | 38.7 | g |

(b) over 8 h, the following solution of:

| | | |
|---|---|---|
| (i) ammonium persulfate | 0.84 | g |
| (ii) sodium bicarbonate | 1.23 | g |
| (iii) sodium lauryl sulfate | 1.5 | g |
| (iv) water | 46.4 | g |

The reaction mixture was maintained a. 30° C. for 1 h and then cooled.

A latex M having a solids content of 25% was obtained.

The acrylic polymer had a glass transition temperature of 61° C. and a free carboxylic functional group content of 150 millimoles per 100 g of polymer.

EXAMPLES 6 TO 11 AND COMPARATIVE EXAMPLES 6 TO 10

Production of transparent receptor substrates for photocopying:

The base film in the examples which follow was a biaxially drawn polyethylene terephthalate (PET) film which had a total thickness of 100 μm, comprising a middle layer A of 98.4 μm of unfilled PET film and on each of the face surfaces of layer A of a layer 0.8 μm of PET containing 0.3000% of an inorganic filler of 3.5 μm mean diameter (silica of Sylobolic® type), the particle size having been measured by means of a laser particle size analyzer of Sympathec® trademark and of Helos type.

Production thereof was as follows. The coextruded amphorous film was first drawn monoaxially in the lengthwise direction with a ratio of 3.8 and was then coated on one of its face surfaces with a latex as prepared in the Examples and Comparative Examples described above (after dilution, to have a solids content of 17% by weigh. ), in a proportion of 1.4 g/m$^2$ (in the wet state).

The coating was dried and the film was then drawn in the transverse direction with a ratio of 3.8. The final acrylic layer was 0.06 μm in thickness.

The biaxially drawn film was heat-set at 235° C.

The film thus obtained had a haze of 4.5, a total roughness Rz of 0.45 μm and shrinkages at 150° C. of 0.6% in the lengthwise and transverse directions.

The toner adhesion and half-discharge time (representing the antistatic nature) were measured on each of the transparent components for photocopying which were thus obtained.

The toner adhesion was measured by photocopying a test card utilizing a Toshiba® BD 2810 photocopier. It was scored from 0 to 10, from the evaluation of the amount of toner stripped away from the transparent component after folding and scratching:

0 corresponds to toner which was completely stripped (very bad);

10 corresponds to toner which was not stripped away at all (excellent);

Values from 8 to 10 are considered to be satisfactory.

The principal characteristics of the latices employed for coating the films and the results of toner adhesion and half-charge time measurements are reported in the Table below:

TABLE I

| Examples and Comparative Examples | Latex employed | COOH of the latex | Tg ° C. of the latex | Toner adhesion | Half-discharge time |
|---|---|---|---|---|---|
| Example 6 | A | 17 | 20 | 9 | >100 s |
| Example 7 | B | 0 | 21 | 9 | 1.5 s |
| Example 8 | C1 | 0 | 20 | 9 | 15 s |
| Example 9 | C2 | 0 | 20 | 9 | 4 s |
| Example 10 | D | 0 | 23 | 9 | >100 s |
| Example 11 | E | 0 | 17 | 9 | <1 s |
| Comparative Example 6 | I | 150 | 33 | 3 | >100 s |
| Comparative Example | J | 102 | 30 | 4 | >100 s |
| Comparative Example 8 | K | 50 | 56 | 7 | >100 s |
| Comparative Example 9 | L | 100 | 58 | 6 | >100 s |
| Comparative Example 10 | M | 150 | 61 | 3 | >100 s |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A transparent receptor substrate suited for electrostatic reprography, which comprises a transparent composite polyester base (S) having a toner-receptive primer coating (P) on at least one of the face surfaces thereof, said composite polyester base comprising (a) a thick layer (A) of semicrystalline polyester and (b) a thin layer (B) of an identical or different polyester adhered to one face surface of said thick layer (A), and optionally a thin layer (B) of identical or different polyester adhered to another face surface of said thick layer (A), said at least one primer coating (P) comprising an acrylic polymer having a glass transition temperature ranging from 10° C. to 50° C., a free —COOH carboxylic functional group content less than 50 millimoles per 100 grams of said acrylic polymer and a thickness no greater than 0.3 μm, wherein said thick layer (A) comprises no filler particles and said at least one primer coating (P) adheres to a face surface of at least one thin layer (B).

2. The transparent receptor substrate as defined by claim 1, the polyester layers (A) and (B) comprising crystalline film-forming polyesters.

3. The transparent receptor substrate as defined by claim 2, said film-forming polyesters comprising a polyterephthalate or polynaphthalenedicarboxylate of an alkylenediol.

4. The transparent receptor substrate as defined by claim 3, said film-forming polyesters comprising a polyterephthalate of ethylene glycol or of 1,4-butanediol.

5. The transparent receptor substrate as defined by claim 1, said acrylic polymer comprising recurring structural units derived from acrylic acid, methacrylic acid, an alkyl acrylate, an alkyl methacrylate, acrylonitrile, methacrylonitrile, acrylamide, methacrylamide, N-methylolacrylamide, N-methoxymethacrylamide, styrene, butadiene or vinyl esters, at least a fraction of said recurring structural units deriving from an alkyl acrylate and/or an alkyl methacrylate.

6. The transparent receptor substrate as defined by claim 3, said acrylic polymer comprising recurring structural units derived from methyl acrylate, ethyl acrylate, a propyl acrylate and/or a butyl acrylate and/or recurring structural units derived from methyl methacrylate, ethyl methacrylate, a propyl methacrylate and/or a butyl methacrylate.

7. The transparent receptor substrate as defined by claim 1, wherein the molar amount of free —COOH carboxylic functional groups in said acrylic polymer is no greater than 30 millimoles per 100 grams thereof.

8. The transparent receptor substrate as defined by claim 1, said acrylic polymer having a glass transition temperature ranging from 15° C. to 30° C.

9. The transparent receptor substrate as defined by claim 1, said at least one primer coating (P) comprising up to 25% by weight of a compound containing quaternary ammonium groups.

10. The transparent receptor substrate as defined by claim 9, said quaternary ammonium compound having the following general formula (I), or is a polymerizate thereof:

(I)

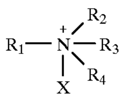

in which $R_1$ is an acyloxyalkyl or acylaminoalky radical containing a saturated acyl group or containing a carbon—carbon ethylenic double bond, an alkoxyalkyl radical, an aryloxyalkyl radical, an alkylaryloxyalkyl radical, an alkenyloxyalkyl radical or an alkenylaryloxyalkyl radical; $R_2$, $R_3$ and $R_4$. which may be identical or different, are each an alkyl radical having from 1 to 6 carbon atoms or a polyoxyethylene radical $$-(CH_2-CH_2-O)_{\overline{n}}-H$$

or $$-(CH_2-CH_2-O)_{\overline{n}}-CH_3$$

wherein n is a number ranging from 1 to 12; and X is an anion selected from among the halides, sulfate, sulfonate, the alkyl sulfonates, the arylsulfonates, the arylalkyl sulfonates, carbonate, the alkyl carbonates, nitrate, phosphate, the alkyl phosphates, or mixtures thereof.

11. The transparent receptor substrate as defined by claim 10, said quaternary ammonium compound comprising stearamidopropyldimethyl-β-hydroxyethyl-ammonium nitrate.

12. The transparent receptor substrate as defined by claim 9, said quaternary ammonium compound comprising a monomer having one of the following general formulae (II) and (III), or is a polymerizate thereof:

(II)

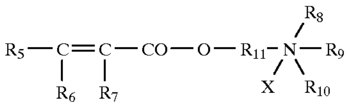

(III)

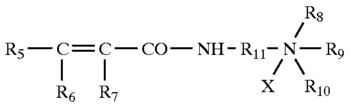

in which $R_5$, $R_6$ and $R_7$, which may be identical or different, are each a hydrogen atom, a methyl radical or an ethyl radical; $R_8$, $R_9$ and $R_{10}$, which may be identical or different, are each an alkyl radical having from 1 to 4 carbon atoms, or a polyoxyethylene radical $$-(CH_2-CH_2-O)_{\overline{m}}-H$$

or $$-(CH_2-CH_2-O)_{\overline{m}}-CH_3,$$

wherein m is a number ranging from 1 to 8; $R_{11}$ is a divalent radical; and X is an anion selected from among the halides, sulfate, sulfonate, the alkyl sulfonates, the arylsulfonates, the arylalkylsulfonates, carbonate, the is alkyl carbonates, nitrate, phosphate, the alkyl phosphates, or mixtures thereof.

13. The transparent receptor substrate as defined by claim 1, said at least one primer coating (P) having a thickness eP ranging from 0.02 μm to 0.2 μm.

14. The transparent receptor substrate as defined by claim 13, said thickness eP ranging from 0.02 μm to 0.15 μm.

15. The transparent receptor substrate as defined by claim 1, said thin layer (B) comprising particulate filler material, and said composite polyester base (S) exhibiting a degree of haze no greater than 7%.

16. The transparent receptor substrate as defined by claim 1, said thick layer (A) having a thickness tA ranging from 50 μm to 150 μm and said thin layer (B) having a thickness tB no greater than 3 μm.

17. The transparent receptor substrate as defined by claim 16, said thin layer (B) having a thickness tB ranging from 0.5 $\mu$m to 1.5 $\mu$m.

18. The transparent receptor substrate as defined by claim 1, said composite polyester base (S) exhibiting a degree of haze no greater than 7%, a shrinkage ratio in the lengthwise and transverse directions no greater than 1% at 150° C. and a total roughness Rz no greater than 0.6 $\mu$m.

19. The transparent receptor substrate as defined by claim 1, said thick layer (A) and said thin layer (B) being at least monoaxially oriented.

20. The transparent receptor substrate as defined by claim 1, said thick layer (A) and said thin layer (B) being at least biaxially oriented.

21. The transparent receptor substrate as defined by claim 1, comprising a sheet material.

22. The transparent receptor substrate as defined by claim 1, comprising a continuous film.

23. The transparent receptor substrate as defined by claim 1, having a toner pattern of adhered to said at least one primer coating (P).

24. The transparent receptor substrate as defined by claim 1, said composite polyester base (S) comprising a coextrudate.

25. A process for the preparation of the transparent receptor substrate as defined by claim 1, comprising coextruding said thick layer (A) and said thin layer (B) into said composite polyester base (S), and then depositing said primer coating (P) onto at least one face surface thereof.

26. The process as defined by claim 25, comprising at least biaxially orienting said composite polyester base (S) prior to depositing said at least one primer coating (P) thereon.

* * * * *